(12) United States Patent
van Lindenberg

(10) Patent No.: US 12,172,402 B2
(45) Date of Patent: Dec. 24, 2024

(54) ASSEMBLY OF A PELLET PRESS AND A PELLET BREAKING DEVICE MOUNTED ON THE PELLET PRESS

(71) Applicant: CPM Europe B.V., Zaandam (NL)

(72) Inventor: Jan-Willem van Lindenberg, Weesp (NL)

(73) Assignee: CPM EUROPE B.V., Zaandam (NL)

( * ) Notice: Subject to any disclaimer, the term of this patent is extended or adjusted under 35 U.S.C. 154(b) by 233 days.

(21) Appl. No.: 17/984,703

(22) Filed: Nov. 10, 2022

(65) Prior Publication Data

US 2023/0119811 A1   Apr. 20, 2023

Related U.S. Application Data

(63) Continuation of application No. PCT/NL2020/050301, filed on May 12, 2020.

(51) Int. Cl.
*B30B 11/20* (2006.01)

(52) U.S. Cl.
CPC .................. *B30B 11/202* (2013.01)

(58) Field of Classification Search
CPC ..... B30B 11/20; B30B 11/201; B30B 11/202; B29C 48/0022; B29C 48/345; B29B 9/06
USPC ........................... 425/365, 383–403; 264/142
See application file for complete search history.

(56) References Cited

U.S. PATENT DOCUMENTS

| 2,775,788 A * | 1/1957 | Andrew .................. B29B 9/065 264/142 |
| 2,979,769 A * | 4/1961 | Andrew .................. B29B 9/065 425/10 |

FOREIGN PATENT DOCUMENTS

| DE | 102016201579 A1 * | 8/2017 | .......... B30B 11/201 |
| EP | 2727715 A3 | 4/2017 | |
| FR | 3028446 A1 | 5/2016 | |
| GB | 889628 A | 2/1962 | |
| WO | 2021230741 A1 | 11/2021 | |

* cited by examiner

*Primary Examiner* — Galen H Hauth
*Assistant Examiner* — Ariella Machness
(74) *Attorney, Agent, or Firm* — Justin R. Muehlmeyer; Peacock Law P.C.

(57) ABSTRACT

An assembly of a pellet press and a pellet breaking device mounted on the pellet press, the pellet press being equipped with a cylindrical outer wall that is provided with a series of radial through holes with a predefined hole-diameter for radially and outwardly pressing the pellets from within the press towards and away from an outer circumferential contour of the pellet press, the breaking device shaped as a spiral encircling the pellet press at a predefined distance from the outer circumferential contour of the pellet press, the spiral spans at least a part of the outer circumferential contour of the pellet press along an area that is provided with said through holes, and the predefined distance between the spiral and the outer circumferential contour of the pellet press amounts to at least twice the pre-defined hole-diameter of the through holes.

2 Claims, 8 Drawing Sheets

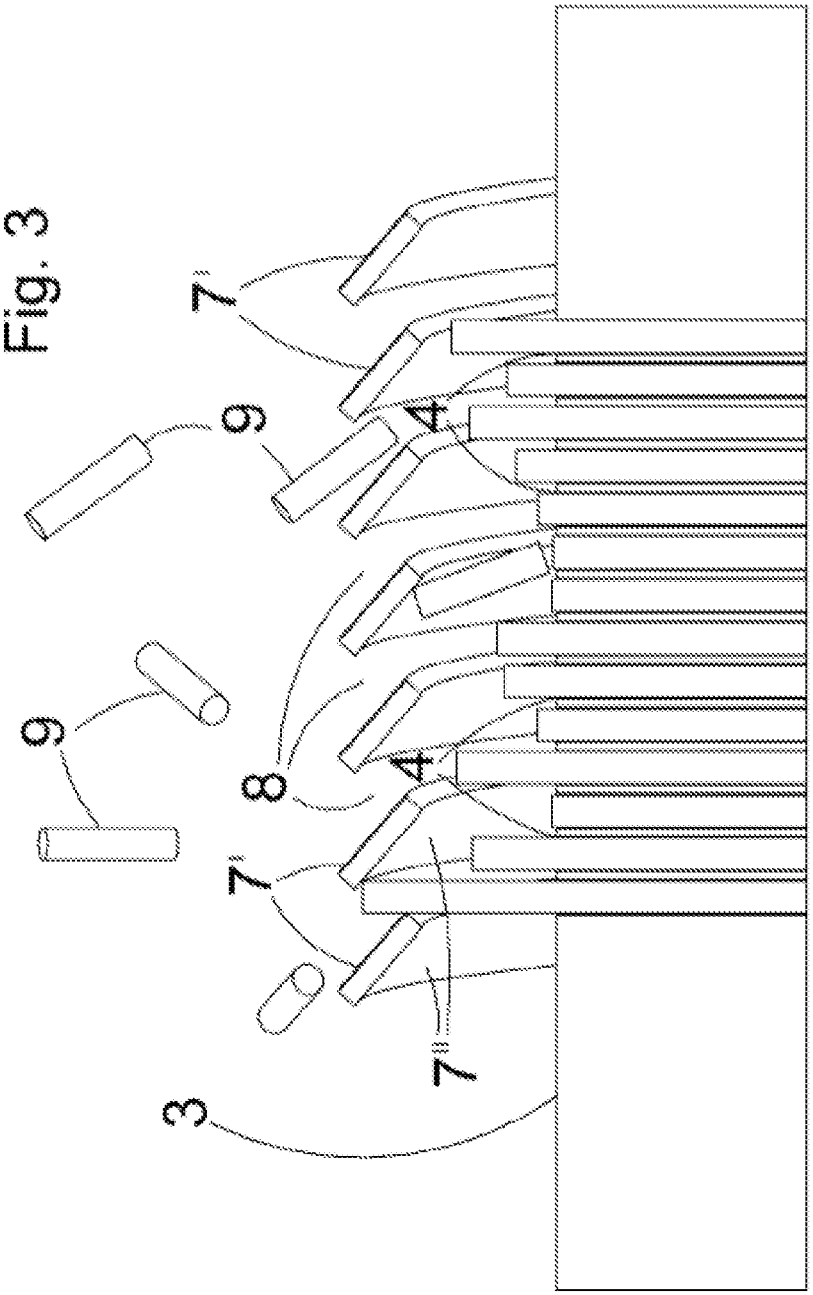

ASSEMBLY OF A PELLET PRESS AND A PELLET BREAKING DEVICE MOUNTED ON THE PELLET PRESS

CROSS-REFERENCE TO RELATED APPLICATIONS

This application is a continuation of International Patent Application No. PCT/NL2020/050301, titled "An Assembly of a Pellet Press and a Pellet Breaking Device Mounted on the Pellet Press", filed on May 12, 2020, and the specification and claims thereof are incorporated herein by reference.

BACKGROUND OF THE INVENTION

Field of the Invention

The invention relates to an assembly of a pellet press and a pellet breaking device mounted on the pellet press, said pellet press being equipped with a cylindrical outer wall that is provided with a series of radial through holes with a predefined hole-diameter for radially and outwardly pressing the pellets from within the press towards and away from an outer circumferential contour of the pellet press.

Background Art

EP-A-2 727 715 discloses a pellet breaking device. The known pellet breaking device is equipped with pellet cutting means and at least one attachment region in which the cutting means are attached on a fixed housing part of the pellet press such that the cutting means can be arranged at a predefined space from the pellet press. The cutting means has a concave arcuate contour which is substantially helical over at least a region of one of the radial through-holes of the ring die of the pellet press, so that a pellet, via the ring die in the radial direction and with a greater length than the distance between the ring die and the cutting means protrudes from the through hole, then in the region of its free end comes to rest on a base body with a concave circular-arc radial guide surface on which the cutting means is mounted, and can move along the circumferential direction of the base body such that the pellet is deflected by the cutting means by means of a force having an axial component, so that the pellet kinks in the region of the ring die.

In the assembly of the pellet press and the pellet breaking device according to EP-A-2 727 715, the breaking device is shaped as a spiral encircling the pellet press at a predefined distance from the outer circumferential contour of the pellet press, wherein the spiral spans at least a part of the outer circumferential contour of the pellet press along an area that is provided with said through holes, and wherein the predefined distance between the spiral and the outer circumferential contour of the pellet press amounts to at least twice the pre-defined hole-diameter of the through-holes for the pellets.

The invention has as an object to depart from the complicated and heavy design known from EP-A-2 727 715, and to provide an assembly of a pellet press and a pellet breaking device which is contrary to the known device energy-efficient and reliable in providing pellets of well-defined length within a limited length-range. A maximum length of the pellets is approximately 40 mm.

FR 3 028 446 discloses a machine for manufacturing granules by pressing a pulverulent material, said machine comprising a frame defining an enclosure; a perforated annular die mounted in the enclosure and driven in rotation relative to the frame; at least one pressure roller mounted in the die in the vicinity of an internal face thereof; and a device for cutting granules comprising a grid which extends at least partially around the die opposite an external face thereof.

GB 889,628 discloses an extrusion machine having a plurality of tapered orifices. Each orifice comprises an inlet and an outlet, and a tapered wall of at least a portion of each orifice intersects the outer wall of said die in a knife-edge transverse to the flow of material, the inlet of each orifice being larger than the outlet, the intersecting angle between the tapered wall of each orifice and the outer wall of said die being no more than 60.

Discussion of publications herein is given for more complete background and is not to be construed as an admission that such publications are prior art for patentability determination purposes.

BRIEF SUMMARY OF THE INVENTION

A pellet breaking device according to an embodiment of the present invention has the features of one or more of the appended claims.

In a first aspect of the assembly of the pellet press and the pellet breaking device according to an embodiment of the invention, the consecutive windings of the spiral define open slots between said windings, wherein the slots are arranged to enable the pellets to escape through said slots,
- the open slots between the windings of the spiral are arranged such that during operation of the pellet press the open slots receive the pellets and that said windings are arranged to subsequently break the pellets growing out of the outer circumferential contour of the pellet press,
- the consecutive windings of the spiral are embodied with obliquely slanting surfaces with respect to the outer circumferential contour of the pellet press, wherein said obliquely slanting surfaces are bordering the slots, and
- the obliquely slanting surfaces of the consecutive windings of the spiral are arranged to narrow a line of sight between the windings in the radial direction away from the outer circumferential contour of the pellet press so as to prevent that pellets can escape through the slots unhindered and in a straight line, yet can escape through the slots following a bending and breaking motion of the pellets which occurs approximately at the outer circumferential contour of the pellet press.

Preferably the obliquely slanting surfaces are at an angle of about 40° with reference to the outer circumferential contour of the pellet press.

In the pellet press and the pellet breaking device according to an embodiment of the invention, the spiral surrounding the pellet press thus provides a series of consecutive free-standing windings encircling the pellet press at said predefined distance from the outer circumferential contour of the pellet press. The word freestanding as used herein signifies that the windings are substantially free from supports that close the room between the windings. The freestanding windings arrange for a comparatively light design with notable benefits in the limitation of energy consumption, whilst the effectiveness of breaking the pellets at an intended length is safeguarded. It has been found that the invention provides that the pellets are all maintained well within a predefined length-range amounting to 3 to 5 times the pellet diameter, whereas the occurrence of fines is effectively countered.

It is possible that the mentioned predefined distance between the consecutive free-standing windings of the spiral and the pellet press is a fixed distance or an adjustable distance.

The effectiveness of breaking the pellets at their intended length is promoted by arranging that the spiral encircles the outer circumferential contour of the pellet press uninterruptedly.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 3 shows a detail of the pellet breaking device mounted on a pellet press according to an embodiment of the present invention in a detail cross-sectional view, during operation.

DETAILED DESCRIPTION OF THE INVENTION

Figure 1:
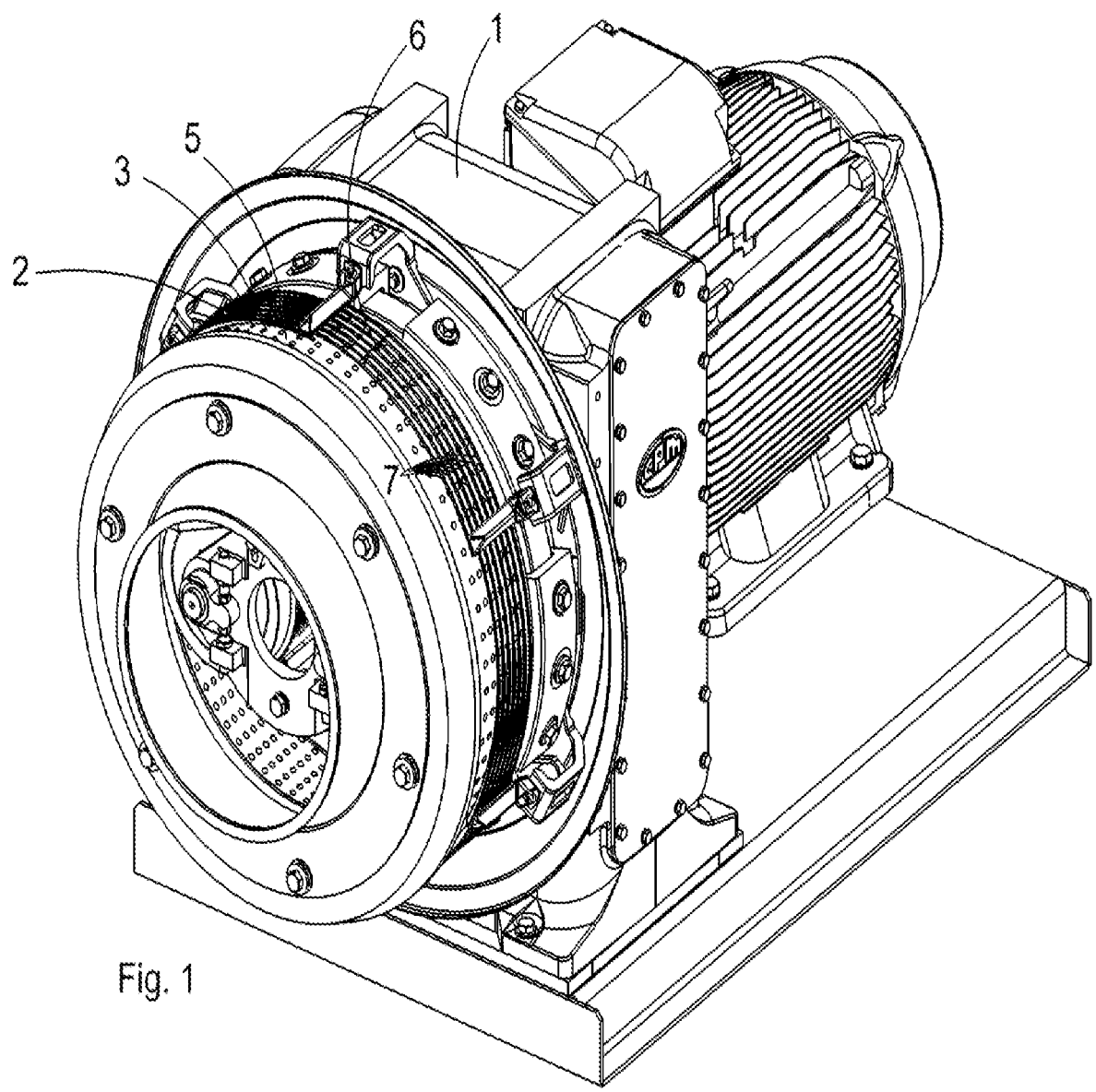
FIG. 1 shows a pellet breaking device mounted on a pellet press according to an embodiment of the present invention in an isometric view.

Whenever in the figures the same reference numerals are applied, these numerals refer to the same parts.

Making first reference to FIG. 1, it shows a pellet press 1 on which a pellet breaking device 2 according to the invention is mounted. In a way known to the skilled person the pellet press 1 is equipped with a cylindrical outer wall 3 that is provided with a series of radial through holes 4. These radial through holes 4 have a pre-defined hole-diameter tailored to the intended diameter of the pellets, and are visible in the cross-sectional view of FIG. 3. The holes 4 serve for radially and outwardly pressing the pellets from within the press 1 towards and away from an outer circumferential contour 5 of the pellet press 1. Said outer circumferential contour 5 of the pellet press 1 is the outer surface of the cylindrical outer wall 3 of the press 1.

FIG. 1 clearly shows that the breaking device 2 is shaped as a spiral 6, wherein the spiral 6 follows the outer circumferential contour 5 of the pellet press 1 at a predefined distance; see also FIG. 3. The spiral 6 is equipped with a series of consecutive free-standing windings 7, wherein the word freestanding signifies that the windings 7 are substantially free from supports that close the room between the windings 7. The freestanding windings 7 encircle the pellet press 1 at the earlier mentioned predefined distance from the outer circumferential contour 5 of the pellet press 1. The predefined distance between the spiral 6 and the outer circumferential contour 5 of the pellet press 1 amounts to at least twice the pre-defined hole-diameter of the holes 4.

Further said free-standing windings 7 of the spiral 6 span at least a part of the outer circumferential contour 5 of the pellet press 1 along an area that is provided with said through holes 4, as will be clear to the skilled person from FIG. 3 and FIG. 1 in combination.

In the respective FIGS. 2a, 2b, 2c, 2d and 2e, the windings 7 of the spiral 6 are shown separate from the pellet press 1, and from these figures in combination with FIG. 1 it is clear that the consecutive windings 7 of the spiral 6 encircle the outer circumferential contour 5 of the pellet press 1 uninterruptedly.

Figure 2A:
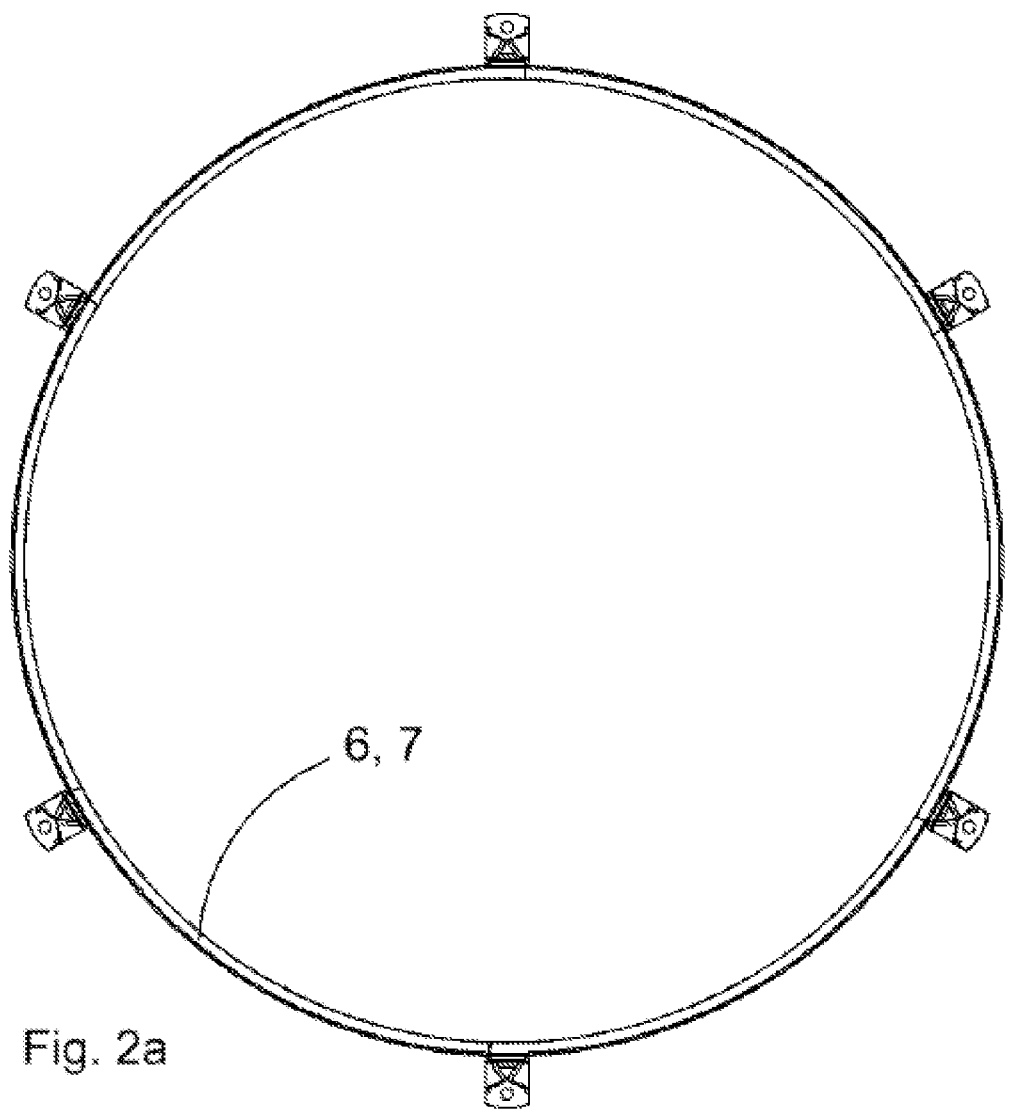
FIGS. 2a, 2b, 2c, 2d and 2e show the pellet breaking device according to an embodiment of the present invention in respectively a frontal view, a side view, an isometric view, a detail view, and a cross-sectional detail side view.
Figure 2B:
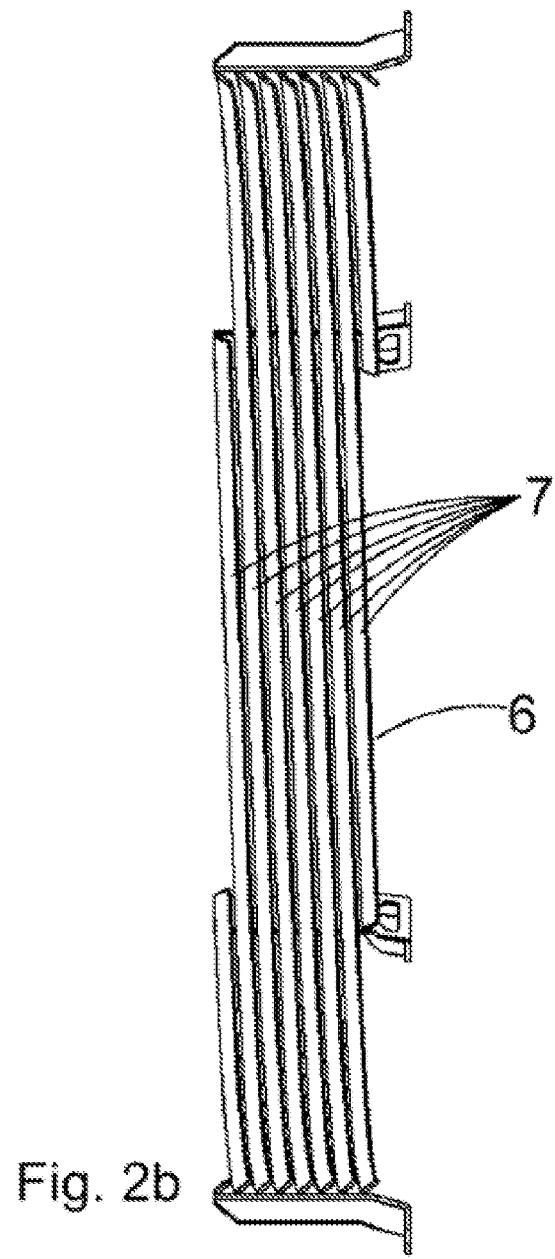
Figure 2C:
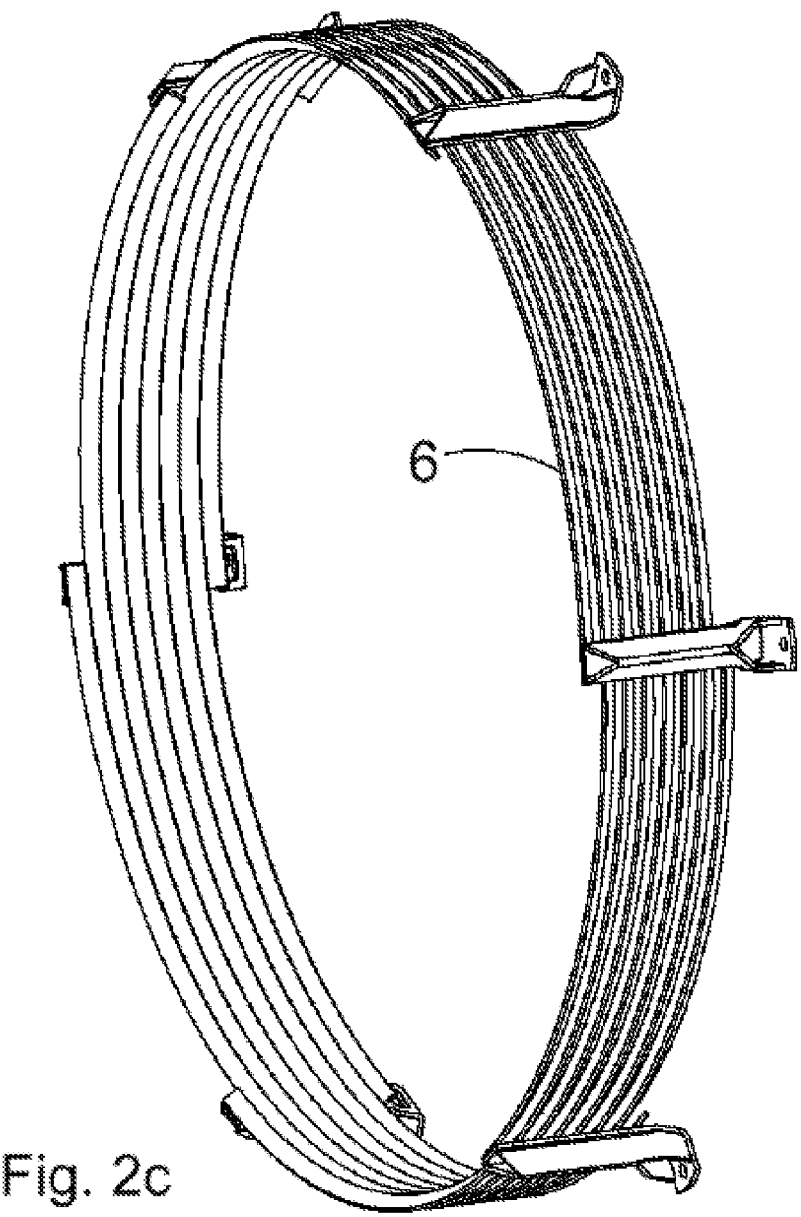
Figure 2D:
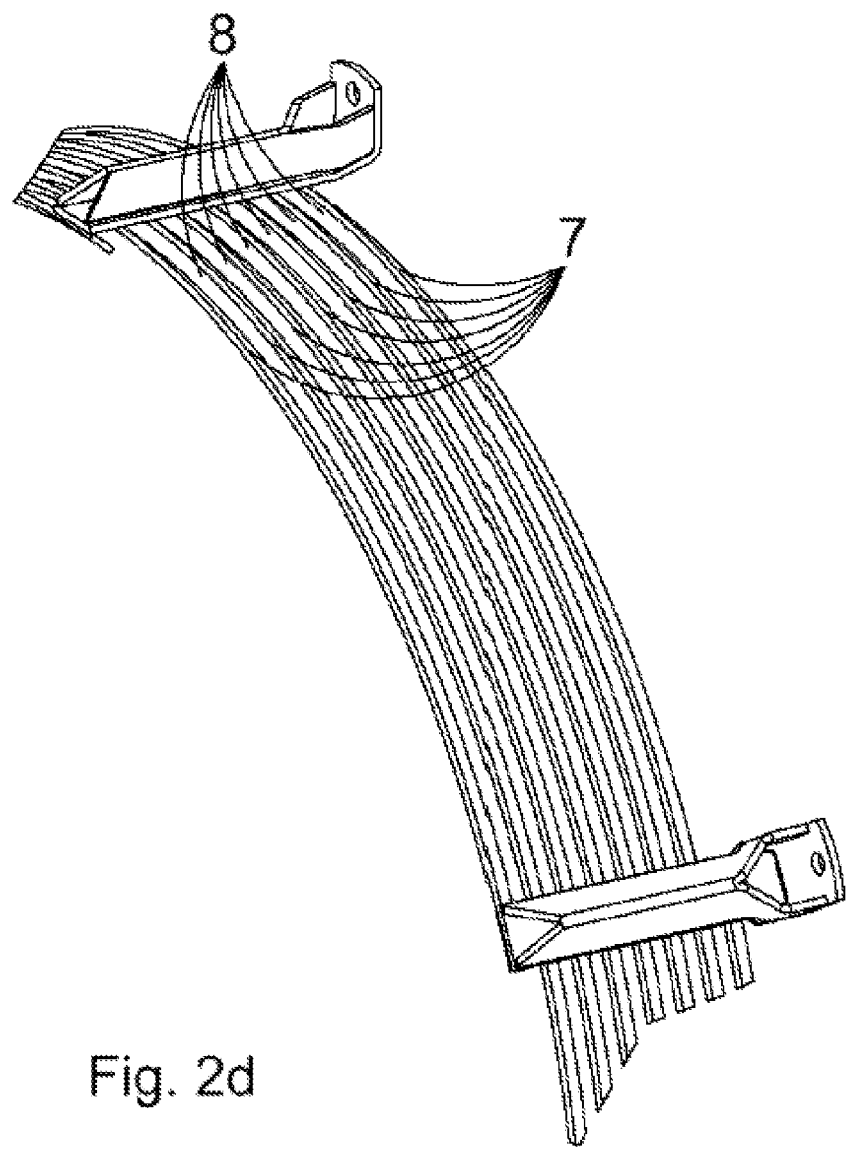
Figure 2E:
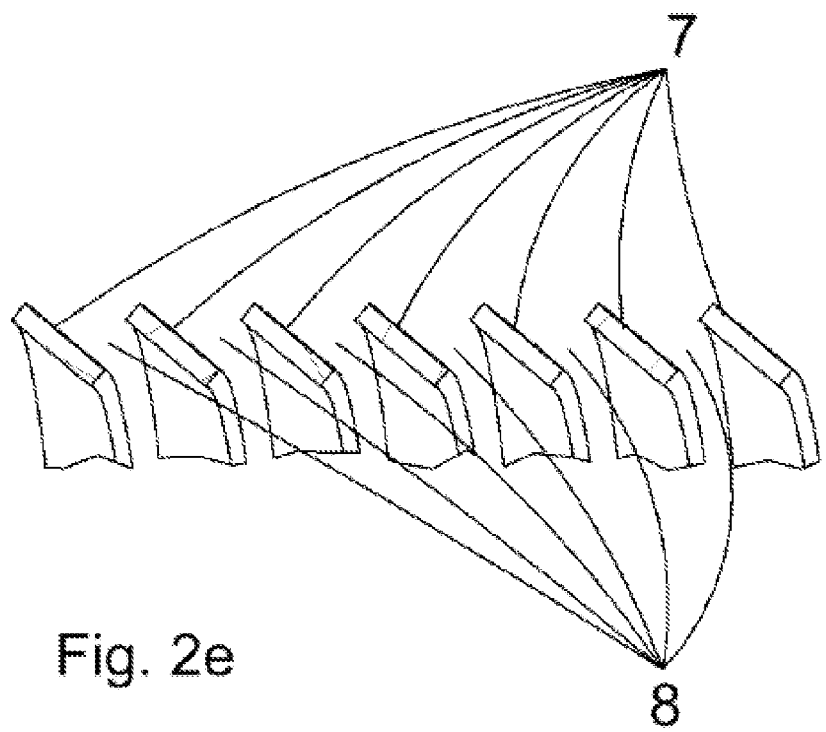

Particularly FIGS. 2d and 2e show that the consecutive windings 7 of the spiral 6 define open slots 8 between said windings 7. FIG. 3 shows that the slots 8 are arranged to enable the pellets 9 to escape through said slots 8. The open slots 8 between the windings 7 of the spiral 6 are arranged such that during operation of the pellet press 1 the open slots 8 receive the pellets 9 and said windings 7 are arranged to subsequently break the pellets growing out of the outer circumferential contour 5 of the pellet press 1. This breaking action is brought about by a rotational movement of the outer circumferential contour 5 of the pellet press 1 with reference to the non-moving windings 7 of the spiral 6.

Both FIG. 2e and FIG. 3 show an embodiment of the present invention in which the consecutive windings 7 of the spiral 6 are embodied with obliquely slanting surfaces 7', 7" with respect to the outer circumferential contour 5 of the pellet press 1, wherein said obliquely slanting surfaces 7', 7" are bordering the slots 8. Preferably the obliquely slanting surfaces 7', 7" are at an angle of about 40° with reference to the outer circumferential contour 5 of the pellet press 1. It is preferred that the obliquely slanting surfaces 7', 7" of consecutive windings 7 of the spiral 6 are arranged to narrow a line of sight between the windings 7 as seen in the radial direction away from the outer circumferential contour 5 of the pellet press 1 so as to prevent that pellets 9 can escape through the slots 8 unhindered and in a straight line, yet can escape through the slots 8 following a bending and breaking motion of the pellets 9 occurring approximately at the outer circumferential contour 5 of the pellet press 1.

Figure 4:
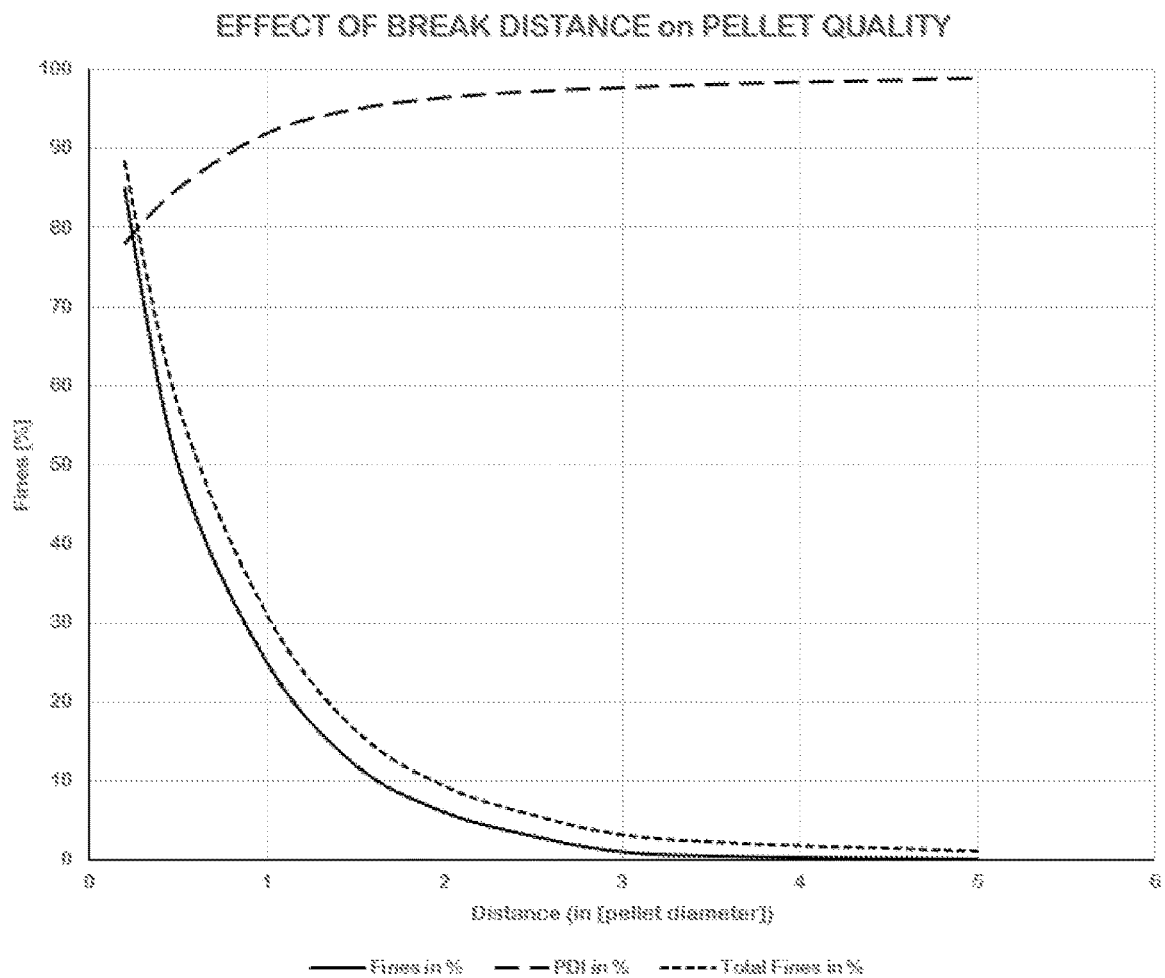
FIG. 4 shows a graphical representation of the pellet quality of the pellets manufactured with an assembly according to an embodiment of the present invention.

FIG. 4 shows a graphical representation of the pellet quality of the pellets manufactured with an assembly according to an embodiment of the invention. The x-axis depicts the distance between the spiral 6 and the outer circumferential contour 5 of the pellet press 1. The y-axis shows the percentage of fines as well as total fines and the pellet durability index as a percentage.

The pellet durability index is measured by taking 100 g of cleansed pellets, i.e. without fines resulting from the manufacturing process, and loading these cleansed pellets during two minutes, and thereafter measuring the percentage of fines. The pellet durability index is then determined by subtracting the fines from the original hundred grams of clean pellets, and expressing the remaining weight of pellets as a percentage of the original weight.

The fines determined with the just mentioned test are considered representative for the fines that would emerge during transport of the pellets. The total fines are calculated as the sum total of the just mentioned fines together with the fines that are removed prior to the performance of the above mentioned test.

From FIG. 4 it is clear that best results are achieved when the predefined distance between the spiral 6 and the outer circumferential contour 5 of the pellet press 1 amounts to at least twice the pre-defined hole-diameter of the holes 4.

Embodiments of the present invention can include every combination of features that are disclosed herein independently from each other. Although the invention has been discussed in the foregoing with reference to an exemplary embodiment of the pellet breaking device mounted on a pellet press according to the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

Note that in the specification and claims, "about" or "approximately" means within twenty percent (20%) of the numerical amount cited. For removal of doubt, it should be understood that any range stated in this written description that does not specifically recite the term "about" before the range or before any value within the stated range inherently includes such term to encompass the approximation within the deviation noted above.

The invention claimed is:

1. An assembly of a pellet press and a pellet breaking device mounted on the pellet press, the pellet press comprising:

a cylindrical outer wall comprising a series of radial through-holes with a predefined hole-diameter for radially and outwardly pressing the pellets from within the press towards and away from an outer circumferential contour of the pellet press, wherein the breaking device is shaped as a spiral encircling the pellet press at a predefined distance from the outer circumferential contour of the pellet press, wherein the spiral spans at least a part of the outer circumferential contour of the pellet press along an area that is provided with the through-holes, wherein the predefined distance between the spiral and the outer circumferential contour of the pellet press amounts to at least twice the pre-defined hole-diameter of the through-holes, wherein the spiral comprises consecutive windings that define open slots between the windings, wherein the slots are arranged to enable the pellets to escape through the slots, wherein the open slots between the windings of the spiral are arranged such that during operation of the pellet press the open slots receive the pellets and the windings are arranged to subsequently break the pellets growing out of the outer circumferential contour of the pellet press, wherein the consecutive windings of the spiral are embodied with obliquely slanting surfaces with respect to the outer circumferential contour of the pellet press, wherein the obliquely slanting surfaces are bordering the slots, and wherein the obliquely slanting surfaces of the consecutive windings of the spiral are arranged to narrow a line of sight between the windings in the radial direction away from the outer circumferential contour of the pellet press so as to prevent that pellets can escape through the slots unhindered in a straight line yet can escape through the slots following a bending and breaking motion of the pellets which occurs approximately at the outer circumferential contour of the pellet press.

2. The assembly according to claim 1, wherein the spiral encircles the outer circumferential contour of the pellet press uninterruptedly.

* * * * *